(12) United States Patent
Certain

(10) Patent No.: US 8,283,796 B2
(45) Date of Patent: Oct. 9, 2012

(54) HYBRID ENGINE INSTALLATION AND A METHOD OF CONTROLLING SUCH AN ENGINE INSTALLATION

(75) Inventor: Bernard Certain, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 711 days.

(21) Appl. No.: 12/503,474

(22) Filed: Jul. 15, 2009

(65) Prior Publication Data
US 2010/0013223 A1    Jan. 21, 2010

(30) Foreign Application Priority Data
Jul. 18, 2008   (FR) ...................................... 08 04093

(51) Int. Cl.
*F02N 11/04*   (2006.01)
*H02K 23/52*   (2006.01)
*H02P 9/04*   (2006.01)

(52) U.S. Cl. ........................................... 290/31; 290/46

(58) Field of Classification Search ............ 290/31, 290/46, 1 A, 4, 4 R, 4 A, 4 C; 60/39.163, 60/706, 474, 475
See application file for complete search history.

(56) References Cited

U.S. PATENT DOCUMENTS

| | | | | |
|---|---|---|---|---|
| 3,368,347 A | * | 2/1968 | Wickman | 60/791 |
| 3,488,947 A | * | 1/1970 | Tischer et al. | 60/791 |
| 3,498,057 A | | 3/1970 | Kronogrard et al. | |
| 3,970,163 A | | 7/1976 | Kinoshita | |
| 4,335,318 A | * | 6/1982 | Mabuchi et al. | 290/31 |
| 4,554,989 A | | 11/1985 | Gruich et al. | |
| 5,762,156 A | | 6/1998 | Bates et al. | |
| 2006/0005544 A1 | | 1/2006 | Herlihy | |

FOREIGN PATENT DOCUMENTS

DE    10 2006 056 354    6/2008
WO    98/55335    12/1998

OTHER PUBLICATIONS

French Search Report dated Mar. 5, 2009, from corresponding French application.

* cited by examiner

*Primary Examiner* — Hae Moon Hyeon
(74) *Attorney, Agent, or Firm* — Brooks Kushman P.C.

(57) ABSTRACT

A hybrid engine installation (200) includes drive element (204) suitable for driving a mechanical element (BTP, BTA) in rotation. In addition, the hybrid engine installation is remarkable in that it includes at least one gas turbine (253, 254) and at least one electric motor (201) mechanically linked to the drive element (204) to drive it in rotation.

19 Claims, 2 Drawing Sheets

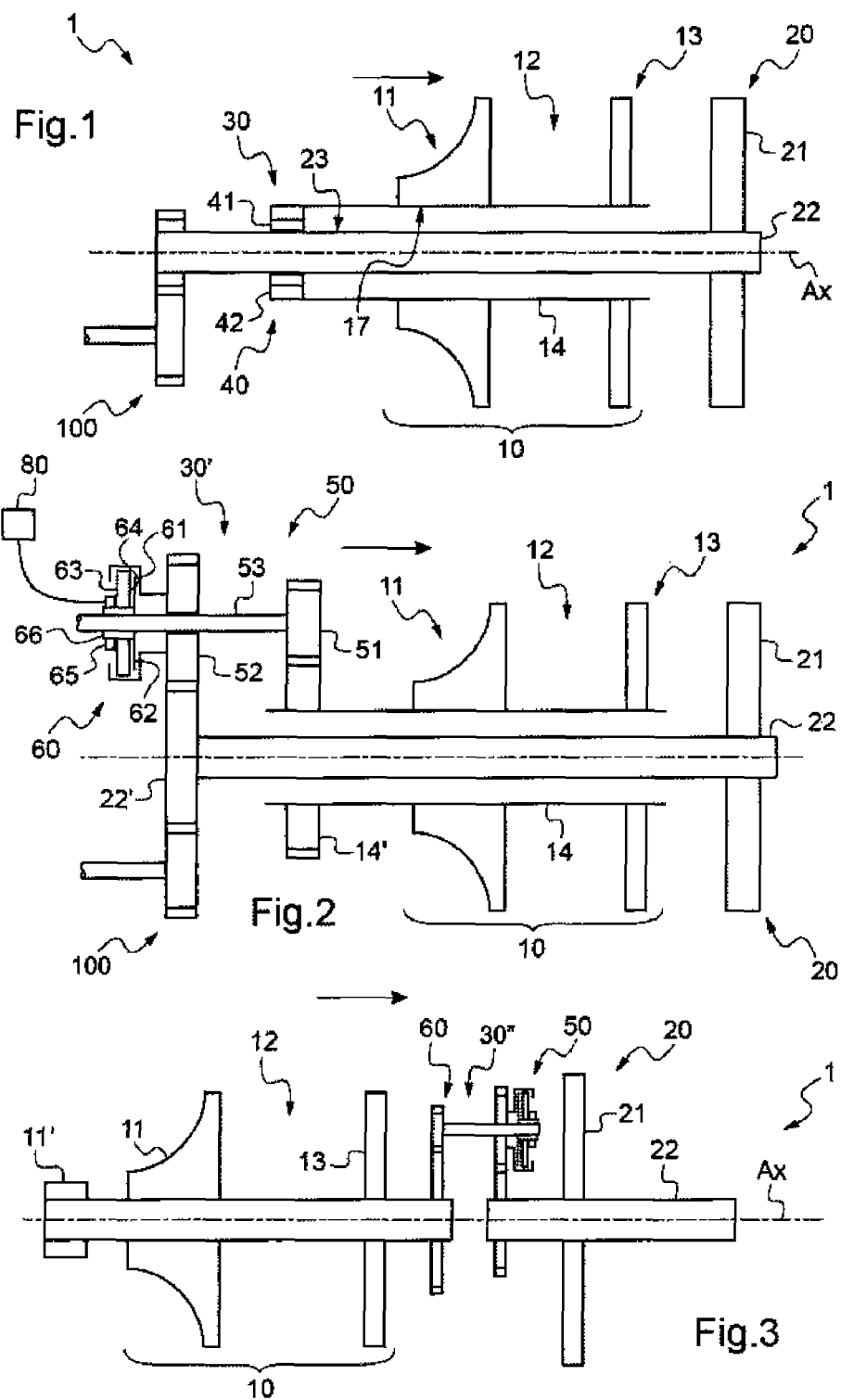

HYBRID ENGINE INSTALLATION AND A METHOD OF CONTROLLING SUCH AN ENGINE INSTALLATION

FIELD OF THE INVENTION

The present invention relates to an engine installation and to a method of controlling such an engine installation.

The purpose of the engine installation is to drive a mechanical element in rotation, e.g. a power transmission gearbox of a rotorcraft, with the help of at least one gas turbine.

Consequently, the technical field of the invention is that of engine installations including a gas turbine.

BACKGROUND OF THE INVENTION

In order to drive the main lift and propulsion rotor of a rotorcraft, in particular via a main power transmission gearbox, a first engine installation is known that implements a gas turbine referred to as a "linked-turbine" gas turbine.

A linked-turbine gas turbine is provided with a gas generator comprising in succession at least one compressor, a combustion chamber, and at least one expansion turbine, the compressor being mechanically linked to the expansion turbine via a main shaft.

It is possible to fit the compressor with a plurality of compression stages that may be axial and/or centrifugal, and it is possible to fit the expansion turbine with a plurality of expansion stages.

In operation, the gas turbine sucks in ambient air. This air is then compressed prior to being directed to the combustion chamber.

A fuel is injected under pressure into the combustion chamber and it is then ignited together with the compressed air.

The gas that results from the combustion is then taken to the expansion turbine where it is expanded. This gas then drives the expansion turbine in rotation about its axis of rotation.

It should be observed that the expansion turbine drives the compressor of the gas generator via the main shaft.

In addition, the main shaft is not used solely for linking the compressor to the expansion turbine. For linked-turbine gas turbines, the main shaft also constitutes the working shaft of the gas turbine and it is suitable for driving a helicopter transmission gearbox, for example.

Although effective, linked-turbine gas turbines suffer from a pumping phenomenon. When this phenomenon occurs, streams of ambient air separate from the blades of the compressor, thereby tending to allow compressed air to back into the compressor.

Consequently, the temperature in the combustion chamber increases greatly. The blades of the linked turbine are then melted almost immediately, thereby destroying the gas turbine.

That is why linked-turbine gas turbines are hardly used any more, at least for helicopter applications.

Linked-turbine gas turbines have thus been replaced in engine installations by higher performance gas turbines known as "free-turbine gas turbines".

A free-turbine gas turbine has a gas generator, of the type described above, followed by a working turbine that is secured to the working shaft of the gas turbine. Unlike a linked-turbine gas turbine, the main shaft of the gas generator and the working shaft are distinct. Consequently, a free-turbine gas turbine is sometimes referred to as a "two-shaft gas turbine".

The gas coming from the expansion turbine of the gas generator then sets the working turbine into rotation, which drives the working shaft of the gas turbine.

Free-turbine gas turbines enable a helicopter to be operated without major difficulty.

Nevertheless, the fuel consumption of a free-turbine gas turbine is relatively high.

In addition, the gas turbines of an engine installation generally operate at a medium speed so as to deliver a medium power, e.g. the so-called maximum continuous power for a helicopter. Nevertheless, the engine installation is sometimes called on to deliver higher power for a short period, such as maximum takeoff power for a helicopter.

Consequently, the gas turbines are overdimensioned overall, so that they are capable temporarily of delivering extra power.

Thus, for most of the time, the gas turbine is delivering power that is remote from its maximum power, thereby leading to increased fuel consumption. The minimum specific fuel consumption occurs on a gas turbine in the vicinity of its maximum power, and increases rapidly at lower powers.

OBJECT AND SUMMARY OF THE INVENTION

An object of the present invention is thus to limit fuel consumption in an engine installation by proposing a novel type of engine installation.

According to the invention, a hybrid engine installation including drive means suitable for driving a mechanical element in rotation, e.g. a rotorcraft main transmission gearbox, is remarkable in that it includes at least one gas turbine and at least one electric motor mechanically linked to the drive means in order to enable said drive means to be set into rotation.

Thus, there is no need to overdimension the gas turbine insofar as the electric motor can provide the extra power.

For example, if the mean power is of the order of 290 kilowatts (kW), the gas turbine may be dimensioned to deliver no more than 300 kW.

In order to deliver the mean power to the mechanical element, the hybrid engine installation then relies solely on the gas turbine.

In contrast, whenever the mechanical element temporarily requires a maximum power of the order of 350 kW, then the engine installation will drive the drive means with the help both of the gas turbine and of the electric motor, presenting respective powers of 290 kW and 60 kW.

By optimizing the dimensioning of the gas turbine, the invention thus enables the fuel consumption of the engine installation to be reduced.

As explained below, this innovative architecture provides other advantages, in particular when implemented on a rotorcraft.

The invention thus provides one or more of the following additional characteristics.

Advantageously, the engine installation includes one external freewheel per gas turbine, e.g. first and second mechanical freewheels for first and second gas turbines, each external freewheel being provided firstly with an external driving gearwheel connected to an intermediate shaft driven by a working shaft of the corresponding gas turbine, and secondly with an external driven gearwheel meshing with the drive means.

The external freewheel then prevents the electric motor and the power system from becoming blocked by a gas turbine, in the event of the gas turbine becoming blocked.

Furthermore, on an installation having at least two gas turbines, the blocking of one gas turbine will not cause the other gas turbine and the power system to become blocked.

In a first configuration, the gas turbine meshes directly with the external driving gearwheel of the corresponding external freewheel. Consequently, a working shaft and the associated intermediate shaft constitute a single shaft.

In contrast, in a second configuration, a working shaft is connected to the associated intermediate shaft via a gear system.

Under such conditions, the electric motor meshes either with the external driven gearwheel of an external freewheel, or with the drive means.

Advantageously, the electric motor is a brushless motor suitable for operating firstly in motor mode and secondly in electricity generator mode in order to brake said mechanical element and/or to feed electricity to at least one battery or to any other member.

Thus, when there is no need to supply extra power to the drive means, the electric motor operates in generator mode and charges one or more batteries, e.g. its own battery(ies).

It should be observed that control means can regulate this mode of operation.

Furthermore, the engine installation may include one temporary external coupling device per gas turbine that is distinct from the associated external freewheel and that is suitable for linking the intermediate shaft to the external driven gearwheel.

For example, an engine installation having two gas turbines can be provided with first and second external coupling devices that are respectively distinct from the first and second external freewheels.

Thus, if the gas turbine(s) are linked-turbine gas turbines or combination gas turbines of a novel type, the electric motor then serves as starter means for the gas turbines.

The temporary coupling device serves to neutralize the associated external freewheel temporarily, thereby enabling the electric motor to drive the gas generator of the corresponding gas turbine via its working shaft.

The hybrid engine installation then does not need a starter to be included, thereby optimizing its weight.

Each external coupling device may optionally include a conventional external clutch controlled by control means of the engine installation.

Advantageously, the engine installation includes a single electric motor together with first and second gas turbines.

The first gas turbine is then connected via a first working shaft thereof to the drive means via a first intermediate shaft, the first external driving gearwheel, and then the first external driven gearwheel of a first external freewheel, a first temporary external coupling device being suitable for linking said first intermediate shaft to the first external driven gearwheel.

Similarly, the second gas turbine is connected via a second working shaft thereof to the drive means via a second intermediate shaft, the second external driving gearwheel, and then the second external driven gearwheel of a second external freewheel, a second temporary external coupling device being suitable for linking said second intermediate shaft to the second external driven shaft.

In addition, at least one gas turbine of the engine installation is an innovative combination gas turbine provided in succession with a gas generator and a working turbine, the gas generator driving the main shaft while the working turbine drives the working shaft, the combination gas turbine including internal coupling means for temporarily coupling the working shaft with the main shaft of the combination gas turbine.

The combination gas turbine implemented in the engine installation is a novel type of gas turbine insofar as it constitutes neither a linked-turbine gas turbine nor a free-turbine gas turbine.

In particular when starting, the coupling means links the working shaft mechanically with the main shaft, and thus with the gas generator and the expansion turbine.

For a gas generator comprising in succession at least one compressor, a combustion chamber, and at least one expansion turbine, the speeds of the compressor and of the expansion turbine increase together.

The combination gas turbine is then in a linked-turbine configuration.

Subsequently, the coupling means no longer couples the working shaft mechanically with the main shaft. The combination gas turbine is then in a free-turbine configuration.

Thus, in a compressor diagram plotting the compression ratio of the gas turbine up the ordinate and the reduced air flow rate along the abscissa, it can be seen that the operating line of a combined turbine is always closer to its pumping limit than is the operating line of a free-turbine gas turbine.

Accelerating the combination gas turbine thus requires less fuel than accelerating a free-turbine gas turbine.

In addition, the combination gas turbine does not require a starter to be implemented insofar as its characteristics enable it to be started by the electric motor of the hybrid engine installation.

Furthermore, in a first mode of operation, the coupling means couple the working shaft to the main shaft of the combination gas turbine, providing the difference between a first speed of rotation of said main shaft and a second speed of rotation of the working shaft is less than or equal to a first predetermined threshold, and decouples the working shaft from the main shaft when said difference becomes greater than the first predetermined threshold, the first predetermined threshold possibly being equal to zero.

It should be observed that while the combination gas turbine is being started, the first and second speeds of rotation are equal. The difference between the first and second speeds of rotation is then equal to the first predetermined threshold, and the working and main shafts are coupled together.

When the second speed of rotation of the working shaft, and thus of the working turbine reaches its nominal speed for normal operation, i.e. when there is no breakdown, the regulator member of the combination gas turbine maintains this nominal speed of rotation for the working turbine via the usual regulator means known to the person skilled in the art.

In contrast, the first speed of rotation of the main shaft tends to increase. The difference between the first and second speeds of rotation becomes greater than the first predetermined threshold. The coupling means then decouple the working shaft from the main shaft so that the first speed of rotation of the main shaft can reach its maximum speed for normal operation.

For example, when the compressor and the working turbine reach the nominal speed of the working turbine, i.e. 45,000 revolutions per minute (rpm), then the coupling means decouple the working shaft from the main shaft.

The regulator member of the combination gas turbine then increases the speed of rotation of the compressor up to a maximum speed of 52,000 rpm, while maintaining the speed of rotation of the working turbine at 45,000 rpm using conventional regulation methods.

In a second mode of operation, the coupling means couple the working shaft to the main shaft of the combination gas turbine when the difference between a first speed of rotation of the main shaft and a second speed of rotation of the working shaft is either less than or equal to a first predetermined threshold, or else greater than or equal to a second predetermined threshold, the coupling means decoupling the working shaft from the main shaft while said difference lies between the first and second predetermined thresholds. The first predetermined threshold may then optionally be equal to zero.

Furthermore, in a first embodiment suitable for implementing the first mode of operation, the coupling means comprises an internal freewheel provided with a driving inner portion and a driven outer portion, the inner portion being secured to the working shaft while the outer portion is secured to the main shaft.

Thus, when the main shaft is rotating faster than the working shaft, i.e. when the difference between a first speed of rotation of said main shaft and a second speed of rotation of the working shaft is greater than a first predetermined threshold equal to zero, then the coupling means are decoupled.

In order to facilitate arranging the various components of the combination gas turbine, the working shaft passes through the main shaft by being concentric therewith.

This first embodiment is particularly, but not exclusively, suited for a combination gas turbine having a working shaft and a main shaft that rotate in the same direction.

In a second embodiment suitable for implementing the first or the second mode of operation, the coupling means comprises a drive system provided with an internal clutch controlled by the regulator member of the gas turbine.

For example, with the main shaft secured to a first main gearwheel, the working shaft being secured to a second main gearwheel, the gas turbine has a first link gearwheel meshing with the first main gearwheel and a second link gearwheel meshing with the second main gearwheel, the first link gearwheel being secured to a link shaft passing through the center of the second link gearwheel, the internal clutch being suitable for temporarily linking the intermediate shaft to the second intermediate gearwheel.

Depending on requirements, the control member of the gas turbine couples or does not couple the working shaft to the main shaft via the internal clutch.

Furthermore, the working shaft may pass through the main shaft by being concentric therewith, or it may extend said main shaft.

More precisely, in the first mode of operation of the second embodiment, the coupling means couple the working shaft to the main shaft when the difference between a first speed of rotation of said main shaft and a second speed of rotation of the working shaft is less than or equal to a first predetermined threshold, and it decouples the working shaft from the main shaft when said difference is greater than the first predetermined threshold, the first predetermined threshold possibly being zero.

In the second mode of operation of the second embodiment, the coupling means couple the working shaft to the main shaft when the difference between a first speed of rotation of the main shaft and a second speed of rotation of the working shaft is either less than or equal to a first predetermined threshold or else greater than or equal to a second predetermined threshold, the coupling means decoupling the working shaft from the main shaft when said difference lies between the first and second predetermined thresholds. The first predetermined threshold may then optionally be equal to zero.

In addition to the engine installation, the present invention also provides a method of controlling said engine installation.

This method is remarkable in that, while starting the installation, the electric motor is temporarily linked to the gas turbine in order to start the gas turbine. There is no longer any need for a specific starter.

Furthermore, during a stage of stabilized operation, the gas turbine advantageously drives the drive means and the electric motor, with the electric motor then operating in electricity generator mode in order to feed electricity to a battery, for example.

In addition, the electric motor is regulated so as to control the speed of rotation of the drive means.

Finally, during a transient stage in which the drive means requires extra power, the drive means may be driven together both by the gas turbine and by the electric motor.

BRIEF DESCRIPTION OF THE DRAWINGS

The invention and its advantages appear in greater detail from the following description of embodiments given by way of illustration with reference to the accompanying figures, in which:

FIG. 1 is a section of a combination gas turbine in a first embodiment;

FIG. 2 is a section of a combination gas turbine in a first variant of a second embodiment;

FIG. 3 is a section of a combination gas turbine in a second variant of a second embodiment;

FIGS. 1 to 3 show an innovative combination gas turbine 1 suitable for being used in the claimed engine installation.

MORE DETAILED DESCRIPTION

Figure 4:
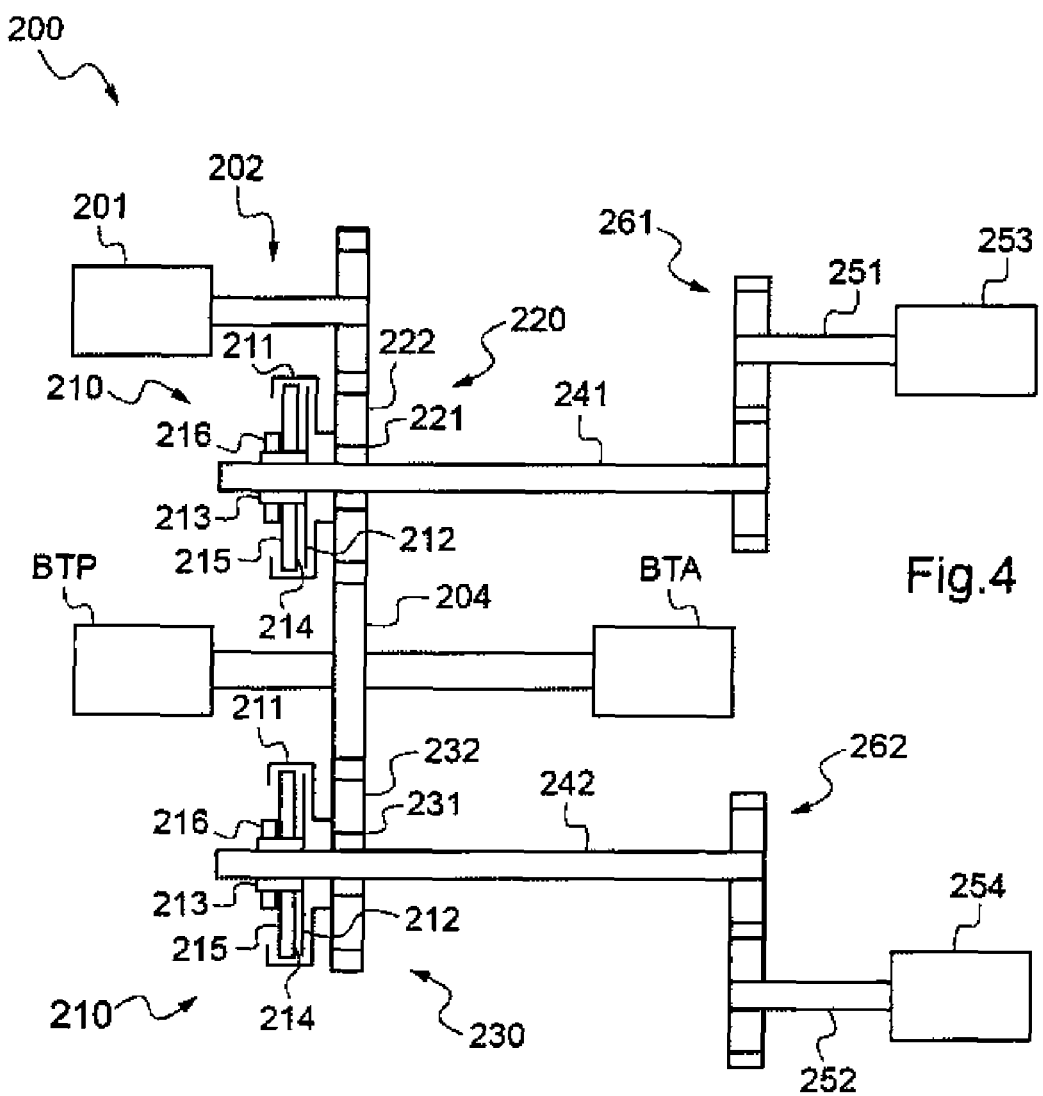
FIG. 4 is a diagram of an engine installation of the invention provided with an electric motor that meshes with an external free wheel.

Whatever the embodiment, the combination gas turbine 1 comprises in succession, in the direction of air flow through the combination gas turbine 1, a gas generator 10 followed by a working assembly 20.

In the direction of air flow through the combination gas turbine 1, the gas generator 10 is conventionally provided with at least one compressor 11, a combustion chamber 12, and at least one expansion turbine 13 connected to the compressor 11 by a main shaft 14.

It should be observed that FIGS. 1 and 2 show a single compressor while FIG. 3 shows an axial compressor 11' followed by a centrifugal compressor 11.

It will be understood that the numbers of compressor(s) and expansion turbine(s) can be optimized depending on requirements, and have no restriction on the scope of the invention.

In addition, the compressor 11, the expansion turbine 13, and the main shaft 14 mechanically connecting them together are suitable for rotating together about the longitudinal axis AX of the gas turbine. More precisely, the compressor 11, the expansion turbine 13, and the main shaft 14 are constrained to rotate together about this longitudinal axis.

The speed of rotation of the gas generator should thus be understood as being the first speed of rotation of the rotary assembly comprising the gas generator and including the compressor 11 together with the expansion turbine 13 and the main shaft 14, these three components of said rotary assembly being set into rotation together and thus having the same speed of rotation about the longitudinal axis AX.

Furthermore, the working assembly 20 comprises at least one working turbine 21 secured to a working shaft 22 suitable for driving an element 100 that is external to the gas turbine, for example a main power transmission gearbox of a helicopter.

Under such conditions, the combination gas turbine 1 is a two-shaft gas turbine.

Nevertheless, the combination gas turbine constitutes neither a free-turbine gas turbine, nor a linked-turbine gas turbine.

The combination gas turbine 1 possesses coupling means 30 suitable for temporarily linking the working shaft 22 to the main shaft 14. Thus, in certain configurations, the combination gas turbine behaves like a gas turbine having a linked turbine, while in other configurations it behaves like a gas turbine having a free turbine.

For example, in a first mode of operation, when the difference between a first speed of rotation of said main shaft 14 and a second speed of rotation of said working shaft 22 is less than or equal to a first predetermined threshold, then the working shaft 22 and the main shaft 14 are temporarily constrained to rotate together about the longitudinal axis AX by the coupling means 30.

In contrast, above this first predetermined threshold, the coupling means 30 releases the working shaft 22, so that the working turbine 21 becomes a free turbine.

Thus, when the working shaft 22 rotates at a second speed equal to the first speed of the main shaft 14, the working shaft 22 is coupled to the main shaft 14.

In contrast, the coupling means releases the working shaft 22 from rotating with the main shaft 14 when the first speed of rotation of the main shaft 14 is greater than the second speed of rotation of the working shaft 22.

On starting, the working and main shafts 22 and 14 are thus linked together by the coupling means 30.

Nevertheless, once the working shaft 22 has reached its nominal speed, the regulator member maintains the second speed of rotation of the working shaft 22 at said nominal speed, e.g. 45,000 rpm.

In contrast, the first speed of rotation of the main shaft continues to increase. The coupling means 30 then uncouples the working and main shafts 22 and 14 so that the main shaft 14 can reach its maximum speed.

It should be observed that regulation is not described in detail insofar as the person skilled in the art can refer to the existing literature.

With reference to FIG. 1, in a first embodiment, the coupling means 30 comprises an internal overrunning clutch or freewheel 40.

This internal freewheel 40 is thus provided firstly with a driving inner portion 41 secured to the outside surface 23 of the working shaft 22, and secondly with a driven outer portion 42 secured to the inside surface 17 of the main shaft 14.

The internal freewheel 40 is of conventional type, being a ratchet freewheel or a freewheel having a plurality of rollers and ramps. The nature of the internal freewheel is thus not limiting in any way.

Thus, the working shaft 22 is suitable for driving the main shaft 14 in rotation, with the working and main shafts 22 and 14 then rotating at the same speed of rotation.

In contrast, if the main shaft 14 rotates faster than the working shaft 22, then the working shaft 22 can no longer drive the main shaft 14 mechanically because of the internal freewheel.

This first embodiment is thus particularly, although not exclusively, suitable for a combination gas turbine having a working turbine that rotates in the same direction as the rotary assembly of the gas generator.

Finally, it can be seen that the working shaft 22 then passes through the main shaft 14, being concentric therewith.

With reference to FIG. 2, in the second embodiment, the coupling means 30' comprise a drive system 50 and an internal clutch 60 controlled by the regulator member 80 of the combination gas turbine 1.

It will be understood, that because of the drive system 50, it is possible, by organizing the various mechanical parts of said drive system in an appropriate manner (not shown), to couple together a working shaft 22 and a main shaft 14 that have opposite directions of rotation.

The drive system shown by way of example comprises a first main gearwheel 14' secured to the main shaft 14 and meshing with a first link gearwheel 51.

The first link gearwheel 51 is fastened to a link shaft 53 that passes through a second link gearwheel 52, the second link gearwheel 52 meshing with a second main gearwheel 22' secured to the working shaft 22.

Under such circumstances, the coupling means 30' is provided with the internal clutch 60 suitable for linking the link shaft 53 to the second link gearwheel 52.

By way of example, this internal clutch 60 is a conventional disk clutch provided with a flywheel 61 secured to the second link gearwheel 52 and with a disk 62 constrained to rotate with the link shaft 53 via fluting 66.

In addition, the internal clutch 60 is provided with a pressure plate 64 fitted with a diaphragm 63 connected to a clutch pin 65.

In the clutched position, the pressure plate 64 presses the disk 62 against the flywheel 61, thereby constraining the link shaft 53 to rotate with the second link gearwheel 52.

To decouple the link shaft 53 from the second link gearwheel 52, and thus the working shaft 22 from the main shaft 14, the regulator member moves the clutch pin 65 to act on the diaphragm 63. The pressure plate 64 then moves towards the free end of the link shaft, thereby disconnecting the disk 62 from the flywheel 61.

It should be observed that any other type of clutch could satisfy requirements.

The second embodiment is advantageous because it offers greater freedom of use.

In addition to the first mode of operation, the second embodiment is capable of implementing a second mode of operation taking account not only of said first predetermined threshold, but also of a second predetermined threshold.

Thus, in nominal operation, the working and main shafts 22 and 14 are decoupled, with the difference between the first and second speeds of rotation of the main shaft 14 and of the working shaft 22 lying between the first and second predetermined thresholds.

Should the blades of the working turbine 21 suffer damage, then the speed of rotation of the working turbine will drop.

The difference between the first speed of rotation of the main shaft and the second speed of rotation of the working shaft then becomes greater than the second predetermined threshold.

Consequently, the regulator member will cause the internal clutch 60 to couple the working shaft 22 to the main shaft 14 in order to guarantee some minimum level of power.

In the first variant of this second embodiment, as shown in FIG. 2, the working shaft 22 passes through the main shaft 14, being concentric therewith.

In contrast, in the second variant of this second embodiment, as shown in FIG. 3, the working shaft 22 is in axial alignment with the main shaft 14.

FIG. 4 shows an engine installation 200 enabling drive means 204 suitable for driving a main transmission gearbox BTP and a tail rotor gearbox BTA of a rotorcraft to be set into rotation.

The engine installation 200 is provided with first and second gas turbines 253 and 254, advantageously both combination gas turbines. In addition, the engine installation is said to be "hybrid" insofar as it also includes a brushless electric motor 201.

Thus, a first working shaft 251 of the first gas turbine 253 is mechanically linked to a first intermediate shaft 241 by a gear system 261.

It should be observed that in a variant, the first intermediate shaft 241 is constituted by one end of the working shaft 251, the first intermediate shaft 241 and the working shaft 251 then constituting a single shaft.

The first intermediate shaft 241 is then secured to a first driving external gearwheel 221 of a first external freewheel 220 that meshes with the drive means 204, the first external freewheel 220 being a freewheel of the usual type.

Similarly, a second working shaft 252 of the second gas turbine 254 is mechanically linked to a second intermediate shaft 242 by a gear system 262.

As a variant, it should be observed that the second intermediate shaft 242 could represent one end of the second working shaft 252, with the second intermediate shaft 242 and the second working shaft 252 then constituting a single shaft.

The second intermediate shaft 242 is then secured to a second driving external gearwheel 231 of a second external freewheel 230 that meshes with the drive means 204, the second external freewheel 230 being a freewheel of the usual type.

Furthermore, the power shaft 202 of the electric motor 201 meshes with the first driven external gearwheel 222.

Figure 5:
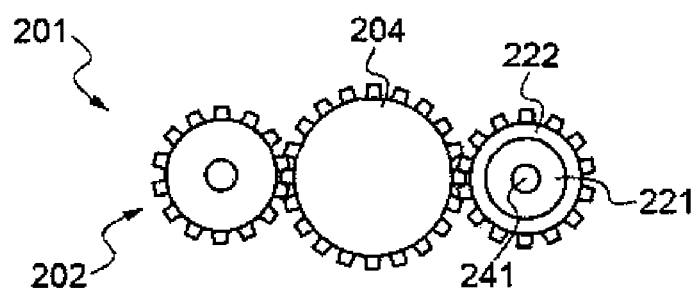
FIG. 5 is a section of an engine installation of the invention provided with an electric motor that meshes with drive means.

Nevertheless, in a variant, and with reference to FIG. 5, the electric motor 201 could mesh directly with the drive means 204 via its power shaft.

In addition, the engine installation 200 possesses one temporary external coupling device per gas turbine, i.e. first and second external coupling devices 210 and 210 respectively for the first and second gas turbines 253 and 254.

Each external coupling device is distinct from the associated external freewheel, but co-operates with said external freewheel. Thus, the first and second coupling devices 210, 210 are distinct from the first and second external freewheels 220, 230 respectively, but they co-operate with said first and second external freewheels 220, 230.

Each external coupling device 210, 210 includes an external clutch of usual type, e.g. provided with a flywheel 211 secured to an associated external driven gearwheel 222, 232, and a disk 212 constrained to rotate with the corresponding intermediate shaft 241, 242 via fluting 213.

In addition, each external clutch is provided with a pressure plate 214 fitted with a diaphragm 215 connected to a clutch pin 216.

Each external coupling device is controlled by control means (not shown) for controlling the engine installation 200.

Thus, while starting, the control means cause each intermediate shaft 241, 242 to be coupled to the external driven gearwheel 222, 232 of the associated external freewheel 220, 230.

More precisely, the control means cause the disk 212 to be pressed against the flywheel 211 of the first coupling device 210 so as to link the first intermediate shaft 241 to the first external driven gearwheel 222 of the first external freewheel 220.

Similarly, the control means cause the disk 212 to be pressed against the flywheel 211 of the second coupling device 210 to link the second intermediate shaft 242 to the second external driven gearwheel 232 of the second external freewheel 230.

Thus, the electric motor 201 is mechanically linked to the first and second gas turbines 253, 254.

The control means then set the electric motor 201 into operation so that it operates in "motor" mode. The electric motor 201 then drives the first working shaft 251 successively via its own power shaft 202, the first external driven gearwheel 222, the first coupling device 210, and then the first intermediate shaft 241.

Similarly, the electric motor drives the second working shaft 252 successively via its own power shaft 202, the first external driven gearwheel 222, the drive means 204, the second external driven gearwheel 232, the second coupling device 210, and then the second intermediate shaft 242.

Since the first and second gas turbines are combination gas turbines, the first and second working shafts 251, 252 set into rotation the rotary assemblies of their gas generators.

When these rotary assemblies reach 50% of their maximum speeds, i.e. 26,000 rpm, for example, the control means cause the first and second coupling devices 210, 210 to decouple the first external driven gearwheel 222 from the first intermediate shaft 241, and the second external driven gearwheel 232 from the second intermediate shaft 242.

The speed of rotation of the gas generator in each gas turbine is then sufficient to continue starting the first and second gas turbines.

The gas turbines then continue to accelerate until they reach the threshold at which the working shaft of each gas turbine is separated from its main shaft.

The speed of rotation of the rotary assembly of the gas generator then continues to increase up to its maximum speed, as authorized by the regulator member of the gas turbine.

Furthermore, as from the decoupling between the first external driven gearwheel 222 and the first intermediate shaft 241, and between the second outer driven gearwheel 232 and the second intermediate shaft 242, the first working shaft 241 drives the drive means 204 via the first external driving gearwheel 221 and the first external driven gearwheel 222 of the first external freewheel 220.

Similarly, the second working shaft 242 drives the drive means 204 via the second external driving gearwheel 231 and the second external driven gearwheel 232 of the first external freewheel 230.

Furthermore, the first external driven gearwheel 222 sets the power shaft of the electric motor 201 into rotation. The electric motor 201 then operates in electricity generator mode and feeds at least one battery with electricity, for example.

It should be observed that the provision of electricity may be regulated so as to control the speed of rotation of the drive means.

This option is particularly useful for a rotorcraft.

By slowing down the drive means 204, the electric motor slows down the speed of rotation of the main rotor.

During a stage of auto-rotation, this option is advantageous insofar as the speed of rotation of the rotor will not increase beyond a floor value that complies with the maximum speed of rotation of the rotor, in the event of the pilot reducing the pitch of the blades.

Furthermore, the invention makes it possible to perform a maneuver that has previously been impossible. In certain configurations, a pilot may desire to shelter a rotorcraft behind a hill.

The pilot thus needs to increase altitude in order to pass over the hill while slowing the rotorcraft down to a great extent.

Conventionally, the pilot pulls up the nose of the rotorcraft and reduces the collective pitch of the blades of the main rotor. As a result the rotorcraft follows an upward curve and therefore cannot shelter behind the hill.

In order to slow down the rotorcraft, the pilot sometimes attempts banking or sideslipping, but without much success.

In contrast, with the invention, it suffices to slow down the speed of rotation of the main rotor with the help of the electric motor so as to enable the rotorcraft to shelter at the desired location.

Finally, if during a transitional stage the drive means require a high level of power, the control means operate the electric motor in "motor mode" to deliver extra power to the drive means.

Naturally, the present invention can be subjected to numerous variations as to its implementation. Although several embodiments are described above, it will readily be understood that it is not possible to identify exhaustively all possible embodiments. It is naturally possible to envisage replacing means that are described by equivalent means without going beyond the ambit of the present invention.

For example, the temporary external coupling devices of the engine installation as described comprise external disk clutches, however they could be constituted by some other type of clutch.

What is claimed is:

1. A hybrid engine installation comprising drive means suitable for driving a mechanical element in rotation, wherein the engine installation includes at least one gas turbine and at least one electric motor mechanically linked to said drive means to set said drive means into rotation; said engine installation including one external freewheel per gas turbine, each external freewheel being provided firstly with an external driving gearwheel connected to an intermediate shaft driven by a working shaft of the corresponding gas turbine, and secondly with an external driven gearwheel meshing with said drive means.

2. The engine installation according to claim 1, wherein a working shaft and said associated intermediate shaft are constituted by a single shaft.

3. The engine installation according to claim 1, wherein a working shaft is connected to the associated intermediate shaft via a gear system.

4. The engine installation according to claim 1, wherein the electric motor meshes with the external driven gearwheel of the external freewheel.

5. The engine installation according to claim 1, wherein an electric motor meshes with said drive means.

6. The engine installation according to claim 1, wherein said electric motor is a brushless motor suitable for operating firstly in motor mode and secondly in electricity generator mode to feed electricity to at least one battery and/or to brake said mechanical element.

7. The engine installation according to claim 1, including one temporary external coupling device per gas turbine that is distinct from the associated external freewheel and that is suitable for linking said intermediate shaft to the external driven gearwheel.

8. The engine installation according to claim 7, wherein said external coupling device includes an external clutch controlled by control means of the engine installation.

9. The engine installation according to claim 1, including an electric motor and first and second gas turbines, said first gas turbine being connected via a first working shaft thereof to said drive means via a first intermediate shaft, the first external driving gearwheel connected to the first intermediate shaft, and then the first external driven gearwheel meshing with said drive means, said second gas turbine being connected via a second working shaft thereof to said drive means via a second intermediate shaft, the second external driving gearwheel connected to the second intermediate shaft, and then the second external driven gearwheel meshing with said drive means, a first temporary external coupling device being suitable for linking said first intermediate shaft to the first external drive gearwheel and a second temporary external coupling device being suitable for linking said intermediate shaft to the second external driven gearwheel.

10. The engine installation according to claim 1, wherein said gas turbine is a combination gas turbine provided in succession with a gas generator and with a working turbine, said gas generator driving a main shaft while said working turbine drives a working shaft, said gas turbine including temporary internal coupling means between said working shaft and said main shaft of said combination gas turbine.

11. The engine installation according to claim 10, wherein said coupling means couples said working shaft to said main shaft of said combination gas turbine when a difference between a first speed of rotation of said main shaft and a second speed of rotation of said working shaft is less than or equal to a first predetermined threshold, and decouples said working shaft from said main shaft when said difference is greater than said first predetermined threshold.

12. The engine installation according to claim 10, wherein said coupling means couples said working shaft to said main shaft of said combination gas turbine when a difference between a first speed of rotation of said main shaft and a second speed of rotation of said working shaft is either less than or equal to a first predetermined threshold, or else greater than or equal to a second predetermined threshold, said coupling means decoupling said working shaft from said main shaft when said difference lies between said first and second predetermined thresholds.

13. The engine installation according to claim 11, wherein said first predetermined threshold has a value of zero.

14. The engine installation according to claim 10, wherein said internal coupling means comprises a drive system fitted with an internal clutch.

15. The engine installation according to claim 10, wherein said internal coupling means includes an internal freewheel provided with a driving inner portion and a driven outer portion, said inner portion being secured to said working shaft while said outer portion is secured to said main shaft.

16. A control method of controlling the engine installation according to claim 1, wherein during a stage of starting said engine installation, said electric motor is linked temporarily to said gas turbine in order to start said gas turbine.

17. The control method according to claim 16, wherein during a stage of stabilized operation, said gas turbine drives said drive means and said electric motor, said electric motor then operating in electricity generator mode.

18. The control method according to claim 17, wherein said electric motor is regulated to control the speed of rotation of said drive means.

19. The control method according to claim 16, wherein during a transient stage during which the drive means requires power, said drive means are driven simultaneously by said gas turbine and said electric motor.

* * * * *